United States Patent [19]

Lacy

[11] Patent Number: 4,999,501

[45] Date of Patent: * Mar. 12, 1991

[54] HIGH SPEED MULTIWIRE PHOTON CAMERA

[75] Inventor: Jeffrey L. Lacy, Houston, Tex.

[73] Assignee: Baylor College of Medicine, Houston, Tex.

[*] Notice: The portion of the term of this patent subsequent to Sep. 26, 2006 has been disclaimed.

[21] Appl. No.: 276,838

[22] Filed: Nov. 28, 1988

Related U.S. Application Data

[63] Continuation of Ser. No. 770,113, Aug. 27, 1985.

[51] Int. Cl.$^5$ ............................................. H01J 47/20
[52] U.S. Cl. .................................. 050/385.1; 250/374
[58] Field of Search .............................. 250/374, 385.1

[56] References Cited

U.S. PATENT DOCUMENTS

| | | | |
|---|---|---|---|
| 3,483,377 | 0/1969 | Borkowski et al. | 250/83.3 |
| 3,517,194 | 0/1970 | Borkowski et al. | 250/83.6 |
| 3,603,797 | 0/1971 | Borkowski et al. | 250/83.6 |
| 3,772,521 | 11/1973 | Perez-Mendez | 250/385.1 |
| 3,786,270 | 0/1974 | Borkowski et al. | 250/385 |
| 3,911,279 | 0/1975 | Gilland et al. | 250/385 |
| 3,919,556 | 11/1975 | Berninger | 250/366 |
| 3,919,557 | 11/1975 | Berninger | 250/366 |
| 4,095,107 | 0/1978 | Genna et al. | 250/363 S |
| 4,151,412 | 0/1979 | Aime et al. | 250/328 |
| 4,320,299 | 0/1982 | Bateman et al. | 250/374 |
| 4,870,282 | 9/1989 | Lacy | 250/374 |

OTHER PUBLICATIONS

"A Gamma Camera for Medical Applications Using a Multiwire Prop. Counter", by Lacey et al., Jour. of Nuc. Med., vol. 25, No. 9, 9-1989.

"Bone Density Determinations with the Multiwire Gamma Camera and I-125 X-Rays"; J. L. Lacy; Abstract, J. Nucl. Med.; 19.

"Multiwire Proportional Counter Gamma Camera and Tantalum-178 Radionuclide-New Imaging Technology"; J. J. Lacy et al.; Abstract, 24 J. Nucl. Med. 24; 1983.

"Multiwire Proportional Counter Imaging Camera and Tantalum 178 Isotope-New Technology in Cardiac Imaging"; Jeffney L. Lacy et al.; Abstract, American Heart Association's 54th Scientific Sessions; Nov., 1981.

"Tomographic Ventricular Reconstruction Using Multiple View First-Pass Radionuclide Angiography"; J. L. Lacy et al; Abstract, Soc. of Nucl. Med.; Jun., 1985.

"Minute to Minute Assessment of Left Ventricular Function With a New Multiwire Gamma Camera and an Ultra-Short Lived Isotope IR-191m"; Jeffrey L. Lacy et al.; Abstract, American College of Cardiology; Mar., 1985.

"New Multiwire Gamma Camera With A Unique Short-Lived Isotope Tantalum-178"; Jeffrey L. Lacy et al.; Abstract, American College of Cardiology; Mar., 1985.

"Biological Fate of Tungsten 178 and Tantalum-178"; J. W. Babich et al.; Abstract, Soc. of Nucl. Med.; June., 1983.

"Multiwire Gamma Camera For Radionuclide and Radiographic Imaging in Space and on Earth"; Jeffrey L. Lacy; RNM Images, Oct., 1983, pp. 44-49.

"The Use of Multiwire Proportional Counters To Select and Localize Charged Particles"; G. Charpak et al.,; 62 Nucl. Inst. Methods 235-240; 1968.

(List continued on next page.)

Primary Examiner—Janice A. Howell
Assistant Examiner—David P. Porta
Attorney, Agent, or Firm—Fulbright & Jaworski

[57] ABSTRACT

An improved multiwire proportional counter camera having particular utility in the field of clinical nuclear medicine imaging. The detector utilizes direct coupled, low impedance, high speed delay lines, the segments of which are capacitor-inductor networks. A pile-up rejection test is provided to reject confused events otherwise caused by multiple ionization events occuring during the readout window.

8 Claims, 5 Drawing Sheets

OTHER PUBLICATIONS

"Some Readout Systems For Proportional Multiwire Chambers"; G. Charpak et al.; 65 Nucl. Inst. Methods 217–220; 1968.

"Advances in Nuclear Medicine Imaging Instrumentation"; Zimmerman; I Medical Radioisotope Scanning 121–125; 1976.

"Multiwire Proportional Chambers in Nuclear Medicine: Present Status and Perspectives"; V. Perez–Mendez et al.; 3 J. Nucl. Med. Biol. 29–33; 1976.

"Pressurized Xenon-Filled Multiwire Proportional Chamber For Radionuclide Imaging"; C. Bolon et al.; IEEE Trans. Nucl. Sci., NS-25(1) 661–664; 1978.

"Electronic Discrimination of the Effective Thickness of Proportional Counters"; C. Borkowski et al.; IEEE Trans. Nucl. Sci., NS-24(1) 287–292; 1978.

"Tantalum-178-A Short Lived Nuclide For Nuclear Medicine: Production of the Parent W-178"; B. Holman et al.; 19 J. Nucl. Med. 510–513; 1978.

"Tantalum14 178-A Short Lived Nuclide for Nuclear Medicine: Development of a Potential Generator System"; R. Neirinckx et al.; 19 J. Nucl. Med. 514–519; 1978.

"Cardiac Imaging With Tantalum-178"; B. Holman et al.; 131 Radiology 525–526; 1979.

"High Resolution Readout of Multiwire Proportional Counters Using the Cathode Coupled Delay Line Technique"; J. Lacy et al.; 119 Nucl. Inst. Methods 483–498; 1974.

"Tantalum-178 Count-Rate Limitations of Anger and Multicrystal Cameras"; A. LeBlanc et al.; 146 Radiology 242–243; 1983.

"Description of a New High Count Rate Gamma Camera System"; R. Jones et al.; Medical Radioisotopes Scintigraphy, International Atomic Energy Agency, Sm-164/122: 299–312; 1973.

"Some Features of Large Multiwire Proportional Chambers"; G. Charpak et al.; 97 Nucl. Inst. and Methods 377–388; 1981.

"A Magnetic Spectrometer For Cosmic Ray Studies"; R. Golden et al.; 148 Nucl. Inst. and Methods 179–185; 1978.

"A Radiotherapy Dose Integrator for 300 kVp X-Rays"; A. Hardwick; 21 Phys. Med. Biol. 236–241; 1976.

"Electronics for the Physicist", Chapter 8–Delay Lines; Delaney; Published by Ellis Horwood Ltd., 1980; pp. 191–194.

"Some Developments in the Operation of Multiwire Proportional Chambers"; G. Charpak et al.; -Nucl. Inst. and Methods 13–34; 1970.

Azam et al.; U.S. Pat. No. 4,034,222; Jul. 5, 1977.

Fletcher et al.; U.S. Pat. No. 3,891,851; Jun. 24, 1975.

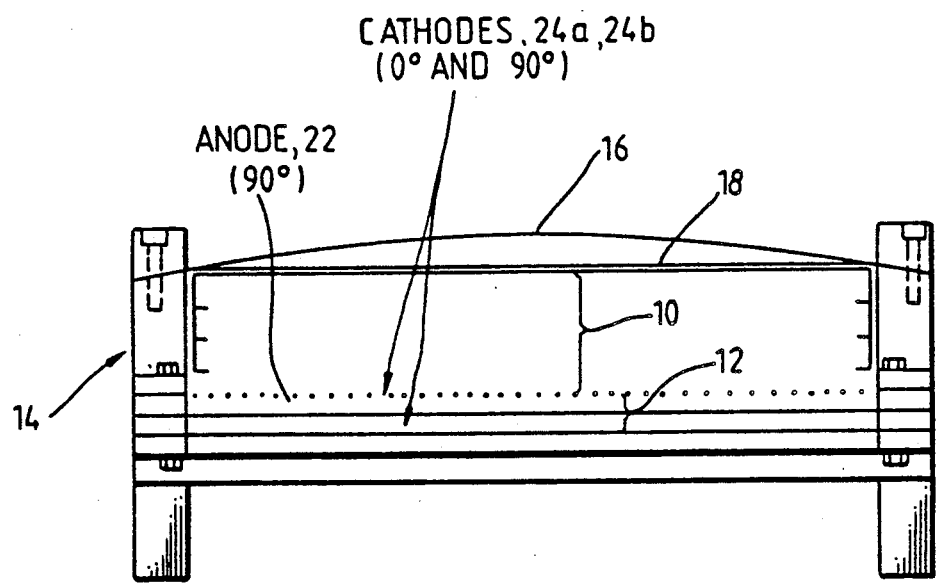
_Fig. 1_
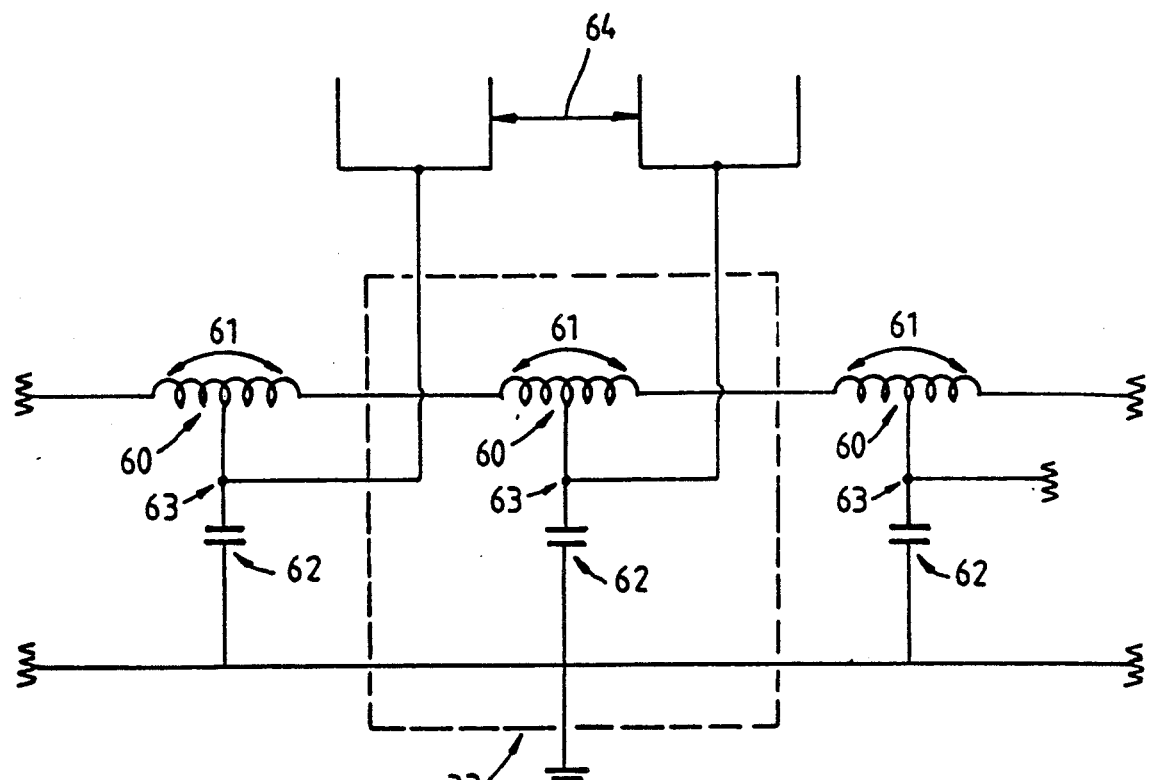
_Fig. 3_

HIGH SPEED MULTIWIRE PHOTON CAMERA

The invention described herein was made in the performance of work under NASA Contract No. NAS 9-15767 and is subject to the provisions of Section 305 of the National Aeronautics and Space Act of 1958 (72 Stat. 435; 42 U.S.C. 2457).

This is a continuation of application Ser. No. 06/770,113 filed Aug. 27, 1985.

BACKGROUND OF THE INVENTION

The present invention relates generally to photon cameras and more particularly to multiwire proportional counters and delay line readouts for such counters. The present invention is of particular utility in the field of clinical nuclear medicine imaging.

In clinical nuclear medicine imaging, small quantities of nuclear material are injected into patients, and the location and distribution of the material are determined via the use of external detectors which respond to the radiation emitted from the patient. The systems in current use are based on sodium iodide (NaI) crystal technology whereby the emitted photons are first converted to light within the crystal, and photomultiplier tubes are then used to amplify and locate those faint light emissions.

One such system in current use, developed by Hal Anger, employs a large bank of photomultiplier tubes. In one embodiment, 37 three-inch tubes are used to view a single large circular NaI crystal having typical dimensions of one-half inch in thickness and ten inches in diameter. Each interaction in the crystal is viewed by a large number of the photomultiplier tubes within the bank. Event position is obtained through examination of the relative pulse heights from the various tubes. In Anger's system, position coordinates are obtained by the addition of tube signals in accordance with a weight factor dependent upon the position of the particular tube within the array, thus providing X and Y coordinate signals whose amplitudes are proportional to the X and Y Cartesian coordinates of an event within the crystal.

The Anger system has several significant disadvantages and shortcomings. The lengthy light emission from the NaI crystal limits event acquisition to rates of no greater than about $2 \times 10^5$ counts per second ("cps") before severe "pile-up" occurs. In pile-up, light from two distinct events enters the photomultiplier tubes at or about the same time, resulting in incorrect determination of position. An additional difficulty is that the discrete nature and the large size of the light detection elements, i.e., the phototubes, produces severe image distortions. These so-called "pin cushion" nonuniformaties must be corrected by complex non-linear transformations. Although this correction can be performed with some effectiveness, significant operational and maintenance problems result because of the need to constantly update the transformation, perhaps on a daily basis, due to such factors as shifts in the photomultiplier tube gain, light coupling efficiency, and shifts in the earth's relative magnetic field.

Additionally, the Anger systems are inherently high energy photon detectors, preferring photons of energies exceeding 80 kev for optimal signal output. These high energies necessitate heavy shielding around the sides and back of the devices as well as heavy collimators (devices used to project images onto the crystal). Consequently, it is not unusual for the heads of these bulky devices to weigh 500 pounds and to occupy three to five cubic feet of space.

Besides the Anger system, a second-type of NaI camera in common use is the multiple crystal camera. Cameras of this design determine position via a matrix of small isolated NaI crystals, each crystal having a facial cross section of about one square centimeter. Each crystal is connected by a split light pipe to two phototubes in such a way that, for example, a 14 by 21 array of crystals can be read out with a 35 tube array. This type of camera is capable of a much higher detection rate, approximately $4 \times 10^5$ cps vis-a-vis $2 \times 10^5$ cps, than is the Anger system. However, it is even bulkier and heavier than the Anger type, is expensive as a result of its complexity, has much poorer spatial resolution (1 centimeter) as a result of the size of the crystal matrix elements, and also has very poor ability to measure the energy of the interacting photons, an important requisite in nuclear medicine applications.

The several disadvantages of the sodium iodide crystal cameras leads one to explore other types of devices, especially for use in nuclear medicine, including multiwire proportional cameras. The early detectors in this field were a natural extension of the single wire proportional detector which has been employed for many years for detection and energy measurements of ionizing radiation of many forms. In this detector, a single fine detection wire is mounted within a cylindrical container and is operated at a high positive potential relative thereto. A noble gas (such as argon, krypton, or xenon) is maintained within the intervening space with an admixture of a quench agent, such as methane or carbon dioxide. Ionizing radiation is detected through its interaction in the gas and the consequent release of a small number of free electrons which are amplified through avalanche in the near vicinity of the fine positively charged anode electrode after drift of the free ionization to the region of the anode wire.

Others extended this single wire system to an area detector by providing a planar wire grid anode structure surrounded by an equidistant pair of planar electrodes in place of the cylindrical shell to form cathode electrodes. It was shown that the grid wires in the anode could be placed as close as 1 millimeter apart while still maintaining similar proportional avalanche characteristics to those of single wire detectors, apparently because the cylindrical symmetry holds to a good approximation in areas near each wire where the avalanche phenomenon takes place. Additionally, it was demonstrated that the paired cathode electrodes could be configured in a given grid structure oriented at any angle relative to the anode wire grid and that the cathodes could be employed to determine the position of avalanche on the grid by detecting the induced pulses of equal and opposite magnitude imparted to the cathodes.

While the single wire proportional detector had served as an accurate energy quantity measurement device by virtue of the proportionality between the photon energy input and its signal output, the introduction of the multiwire proportional detector offered great potential for simultaneous position and energy quantity measurement of photons. However, the multiwire proportional counter ("MWPC") also has some disadvantages. One of its disadvantages to date has been its speed. The basic proportional avalanche process is relatively rapid compared with that in other devices such as sodium iodide or spark detectors. Events from a single wire can be recorded at rates exceeding one million per second, and from a large area multiwire detector at rates of up to 100 times this rate, or $10^8$ events per second. In contrast, the basic NaI pulse is approximately an order of magnitude slower, limiting rates by a similar factor. Spark devices are slower yet, placing them several orders of magnitude lower in rate compared to the MWPC. Because the MWPC also is capable of equal or superior spatial resolution performance, and is considerably simpler for large area detectors than NaI, the MWPC almost has become the sole means of position measurement in the high energy physics field.

However, heretofore no one has been able to take full advantage of this unique feature of the MWPC (i.e., its ability to perform at very high rates) in many areas of photon imaging. For example, in cardiac imaging a rapidly moving object must be "frozen" with a time resolution of less than one tenth of a second. This means that on the order of $10^5$ photons (the number required to form an acceptable image) must be detected during this minimum image formation time. This requires rates of approximately $10^6$ photons per second. This rate is theoretically possible with the MWPC, but systems developed heretofore are incapable of producing rates above about $10^5$ photons per second.

The devices of U.S. Pat. Nos. 3,772,521 and 3,786,270 to Perez-Mendez and to Borkowski and Kopp are representative of MWPC cameras used in medical (nuclear medicine and radiography) and general materials radiographic imaging. Both describe xenon-filled multiwire detectors substantially similar except for the techniques for electronic digitization of event positions (i.e., their so-called "readout" systems). Each employs three equal-spaced wire planes as detection electrodes, the central plane consisting of fine wires (approximately 20 micrometers diameter) with approximately 2 millimeters spacing, and outer planes consisting of coarser wires (such as 100 micrometers diameter), preferably with orthogonal relative orientation. These wire planes are operated in a gas-tight box which, in the case of the Borkowski and Kopp camera, can be pressurized above atmospheric pressure. The central collection electrode (i.e., the anode) is operated at high positive potential while the surrounding electrodes (i.e., the cathodes) are operated at ground potential. The primary distinction between the two systems is their respective means for decoding the signals in the cathode wires to obtain the position of each photon interaction.

In the Borkowski and Kopp system the cathode wires are connected in a serpentine fashion by resistive elements in such a way that two signals emanating from either end of the serpentine are provided, with each signal's rise time being related to the position of the struck wire within the grid. In particular, the positive ions produced in the avalanche in the vicinity of the anode move toward the cathode planes and induce a displacement current in each cathode which divides into two equal parts and flows through portions of the respective resistor-capacitor (RC) lines and the respective load impedances to ground. The pulse thereby produced across the respective load impedance has a wave shape dependent upon the position of the event within the cathode grids. The pulses are then processed (as taught in U.S. Pat. No. 3,603,797) via timing channel networks comprised of a bipolar pulse shaper and a crossover detector. The output amplitude for each time-to-amplitude converter for each cathode in this system is proportional to the position of an ionizing event on either the X or Y axis as sensed by the particular collector grid.

In the Perez-Mendez system the cathode wires are terminated at one end with a large resistor attached to each wire, and conductor strips are provided at the other end of each wire parallel to the wire and nearly equal in width to the inner wire spacing. Readout is accomplished by placing an electromagnetic delay line in close proximity to those strips, but not in electrical contact with them, so that the wire signals are capacitively coupled into the delay line at a point along its length proportional to the distance of the struck wire at the edge of the detector. Event positions are then encoded by measuring the time delay between the occurrence of a prompting signal obtained from the anode grid and the arrival of signals at each end of the delay line.

As mentioned above, to obtain beneficial use of the MWPC in certain applications, it is necessary to detect up to $10^6$ events per second. In order for events to be digitized from a proportional detector operating at that rate, the readout process must be completed within a very short interval, or "readout window" of less than 0.5 microsecond. Also, since photons enter the detector at random times, successive photons may enter within the readout window, thereby producing a confused readout indicative of the actual photon position of neither event. If these pile-up events are not recognized and effectively rejected, they will produce an undesireable background of incorrect photon positions.

Neither the Perez-Mendez nor the Borkowski and Kopp systems meet either of these requirements for beneficial high rate performance. In the capacitively coupled delay lines of the Perez-Mendez system, the optimum delay times of those delay lines are greater than 50 nanoseconds per centimeter. Thus, in a MWPC having a lateral dimension of 25 centimeters, over 1 microsecond is required to clear the signal from a given event from the delay line. The pulse itself from the anode avalanche is almost an order of magnitude shorter than this (approximately 100 nanoseconds). Thus, the inherent readout window imposed by the delay line clearly limits the ultimate rate performance by a similar amount. While this defect might be remedied by reduction of the delay line delay to less than or approximately 10 nanoseconds per centimeter, this is not practical with the capacitive coupling technique inasmuch as it requires high impedance, high inductance lines in order to achieve adequate capacitive coupling efficiency.

The Borkowski and Kopp technique is similarly limited in rate performance. With this technique, the readout window is determined by the RC time constant chosen for the resistive and capacitive readout elements. In order to use variation of rise time as a measure of position, it is clearly necessary that this rise time be large in comparison with the inherent avalanche rise time. Thus, approaching speeds intrinsically allowed by the avalanche process is clearly difficult. In fact, the system described in U.S. Pat. No. 3,786,270 has a rate capability of only about $2 \times 10^4$ counts per second, far short of the required $10^6$ counts per second.

Also, neither the Perez-Mendez nor the Borkowski and Kopp system even purports to address the problem of pile-up. With the Borkowski and Kopp system, it would be particularly difficult to reject pile-up since two events could combine to give an avalanche rise time which would be indistinguishable from an unconfused event. Further, while both systems are capable of partial rejection of pile-up by rejection of anode pulse levels, this method has proven to be inadequate for complete removal of such events.

In addition, other existing systems also have deficiencies which detract from or prevent their usefulness in medical x-ray and gamma ray imaging. For example, a three plane detector has been developed using a variation of the delay line approach, the so-called "integral delay line". However, this system is not useful for most medical or radiography work because its readout is limited to only one coordinate of the Cartesian X, Y pair.

SUMMARY

There is thus a need for a photon camera utilizing a multiwire proportional counter and having a readout system that permits one to take practical advantage of the counter's inherent ability to perform at very high rates.

It is, therefore, a feature of the present invention to provide a high speed multiwire photon camera for determining the time, position, and amplitude of ionization events within the camera's chamber.

It is a more particular feature of this invention to provide such a camera employing low impedance, high speed, direct coupled delay lines.

Another feature of the present invention is to provide such a camera having a means for rejecting events closely spaced in time, i.e., "pile-up" rejection.

Yet another feature of the present invention is to provide a camera useful in nuclear medicine to accurately determine the location and distribution of nuclear material injected into a patient's body by imaging in response to the radiation emitted from the patient.

Additional features and advantages of the invention will be set forth in part in the description which follows and in part will become apparent from the description, or may be learned by practice of the invention. The objects, features, and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiment given below, serve to explain the principles and attributes of the invention.

FIG. 1 is a longitudinal section view of the presently preferred embodiment of the detector of this invention.

FIG. 3 is a schematic diagram of the circuitry for each segment of the delay line used in the presently preferred embodiment of this invention.

DESCRIPTION OF THE PREFERRED EMBODIMENT

Figure 2:
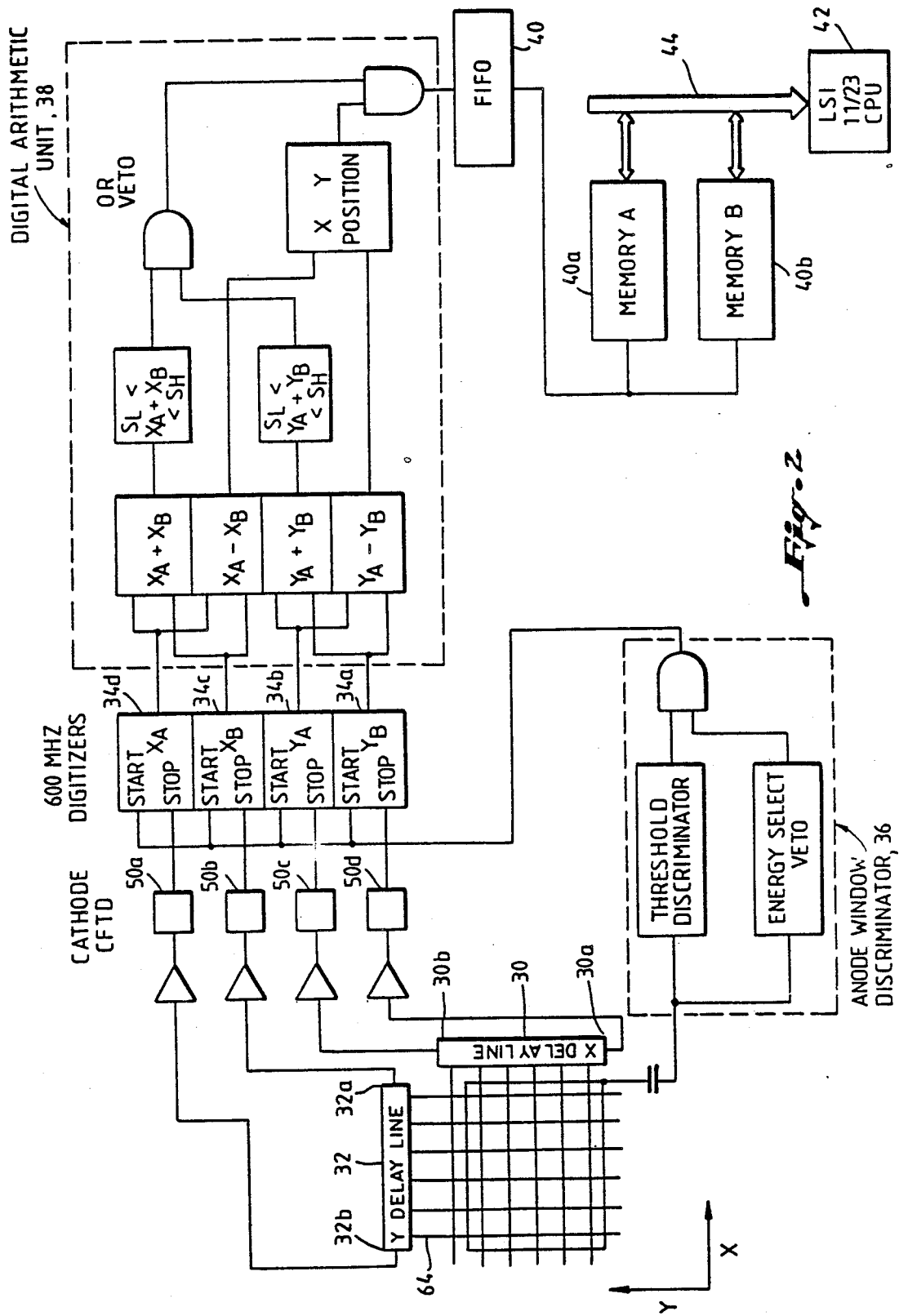
FIG. 2 is a schematic diagram of the readout system employed in the presently preferred embodiment of this invention.

References will now be made in detail to the presently preferred embodiment of the invention as described in the accompanying drawings.

A longitudinal section view of the presently preferred embodiment of the MWPC detector is shown in FIG. 1. As with conventional devices, this detector includes a drift region 10 and a detection region 12 contained within an aluminum pressure vessel 14 having a thin aluminum entrance window 16 of spherical shape. Also within the pressure vessel 14 are a negative high-voltage collection electrode 18, an anode 22 operated at a high positive potential, and two outer electrodes, cathodes 24a and 24b operated at ground potential. Preferably, cathodes 24a and 24b are parallel to and equidistant from anode 22 and are oriented orthogonally to one another. The basic physical characteristics of the detector are set forth in Table 1 below.

TABLE 1

| CAMERA PHYSICAL CHARACTERISTICS | |
| --- | --- |
| Sensitive area | 25 cm diameter |
| Sensitive depth | 5 cm |
| Gas mixture | 90% xenon, 10% methane |
| Gas Pressure | 3–5 atmospheres |
| Wire spacing | 2 mm anode and cathode |
| Anode-cathode spacing | 6 mm |
| Entrance window | 0.51 mm aluminum |
| Total camera weight | 23 kg |
| External dimensions | 40 × 40 × 12 cm |

X-rays entering the aluminum window 16 interact with the pressurized gas (predominantly xenon) in drift region 10. The resulting ions are impelled to the detection region 12 by a drift field of 1000 volts per centimeter. Within the detection region 12, the drifted ionization is collected at the anode 22 where the charge is amplified by gas avalanche.

Position determination of the anode avalanche is obtained by detection of the signals induced in the two cathode grids 24a and 24b. As shown in FIG. 2, the anode grid 22 and cathode grids 24a and 24b are each constructed of multiple courses of fine wire in a manner familiar to those skilled in the art using the intra-electrode and inter-electrode wire spacings set forth in Table 1 above. The wires of each cathode grid 24a and 24b are attached in pairs to their own tap of a discrete delay line 30 and 32, and position is sensed by measurement of the delay time between occurrence of the avalanche on the anode grid 22 and arrival of the signals at the ends 30a, 30b, 32a, 32b of the cathode delay lines 30 and 32.

Unlike earlier delay-line readout systems used in medical applications, such as the Perez-Mendez system described above, the present invention uses very high-speed delay lines 30 and 32 having delays of 10 nanoseconds per centimeter. Consequently, with a sensitive area diameter of 25 centimeters, this invention provides a maximum delay-line clearance time of less than 250 nanoseconds and a typical mean clearance time of about 150 nanoseconds. This constitutes a substantial improvement in rate performance over previous systems.

Delay lines 30 and 32 are constructed of a series of identical segments 33, the nodes of which segments are connected serially to the wires of the cathode grids 30 and 32. Each segment of the preferred delay line construction is a capacitor-inductor (LC) network having the circuitry illustrated in FIG. 3. Tapped discrete inductors 60 are employed, each consisting of a small number of turns of wire on a solid core material (for example, ferrite) of cylindrical cross-section and suitable for operation at the required frequencies. The dimensions of the core and tap position are chosen to provide mutual inductance 61 suitable for phase compensation of the delay line. Discrete capacitors 62 are provided connecting each tap to a low inductance ground buss. In the preferred embodiment, an inductor value of 0.22 microhenry and capacitor value of 88 picofarads provide a convenient 50 ohm impedance and delay of 10 nanoseconds per centimeter. Although these values provide excellent performance, a wide range of values for L and C can be employed to provide an appropriate delay and impedance values while still maintaining near 100% coupling of the wire signals for various applications. Connection of the delay elements to the detector cathode wires 64 is accomplished at the juncture of the inductor tap and capacitor element 63. In the preferred embodiment, cathode wires 64 with spacing of 2 millimeters are connected in pairs to each delay line tap 63. Since the induced pulse in the cathode wire plane is spread over many wires, such pairing produces no significant degradation in resolution performance. ("High Resolution Readout of Multiwire Proportional Counters Using the Cathode Couple Delay Line Technique"; J. Lacy, et al.; 119 Nucl. Inst. Methods 483–498, 1974). The timing of the delay line signal is achieved by standard constant fraction discriminator (CFTD) circuitry which provides a rapidly rising signal coincident in time with the peak of said signal.

The encoding of the position of an event is accomplished through the high-speed digital circuitry depicted in FIG. 2. The four time delays obtained from the delay lines 30 and 32 (i.e., at delay line terminals 30a, 30b, 32a and 32b) are digitized by high-speed counters 34a, 34b, 34c and 34d, operating at 600 MHz, which counters or digitizers are gated on by the anode signal received as the output of the anode window discriminator 36 and gated off by the constant fraction discriminator outputs 50a, 50b, 50c and 50d for each delay line output terminal. These four values, i.e., the outputs of digitizers 34a, 34b, 34c and 34d, are passed on to a high-speed processing unit 38 that forms the digital sum of the coordinates obtained from a given delay line. This sum value is compared with a constant value equal to the total delay of the particular delay line 30 or 32. Because the sum of the delay times measured on the X-coordinate delay line 30 always must be equal to the total delay time for X-delay line 30, and likewise the sum of the Y-coordinate delay times always must be equal to the total delay time for the Y-delay line 32, this test rejects any confused events that result from pile-up or scatter within the detector gas.

In addition, energy selection is accomplished by application of a pulse-height window test to the prompting anode signal received by the anode window discriminator 36. If the anode signal fails this test, i.e., it does not fall within the given amplitude range, the digital counters 34a, 34b, 34c and 34d are not started, and the circuits are immediately ready to process a new event.

Simultaneously with the sum test, the processor 38 also computes a difference between the delays on each axis and adds a digital offset value. This value for each axis (8-bit words) is used as the event position. (For zero offset it is the position relative to the center of the chamber). The digital sum and difference logic is implemented in the preferred embodiment with high-speed, Motorola emitter coupled logic (MECL) circuits that require less than 300 nanoseconds to perform the sum test and to provide the difference position value.

The offset difference values (8 bits X and 8 bits Y) are passed through a formatting circuit that sets the desired frame format. Four frame sizes are facilitated—16×16, 32×32, 64×64, and 128×182. In each of these formats the cell size can be zoomed by factors of 2 and 4. A continuous zoom capability is also provided by variation of oscillator frequency, which can range from 100–600 MHz, providing a continuous zoom by a factor of 6.

The formatted digital position coordinates are transferred through a first in, first out (FIFO) memory 40 into an LSI-11/23 computer 42 by means of a unique dual-ported memory. This memory can respond on the LSI-11 buss 44 as a standard RAM memory, or under software control can be set to respond on an external buss to the digital coordinates from the arithmetic processor 38. The memory can accept events on the external buss at a rate of 3 MHz.

The LSI-11 computer 42 controls data acquisition, display, and storage. Data can be stored either on a flexible disk or hard disk. A color display system (not shown) is used for image display of both processed and real-time images. Static image data can be collected and stored to disk. Dynamic study data can be collected and written to RK05 disk in film-strip fashion. Frames of 64×64 pixels can be collected at 10 fps, 32×32 frames at 40 fps, and 16×16 frames at 160 fps. The image memory of the display system can be used as a high-speed image buffer memory. The 256×256 pixel memory allows storage of up to 64k bytes of acquired image data. Dynamic image data can be collected in this buffer at approximately four times the rate allowed by the RK05 disk. The LSI-11/23 also provides a powerful postdata-collection processing system.

Figure 4:
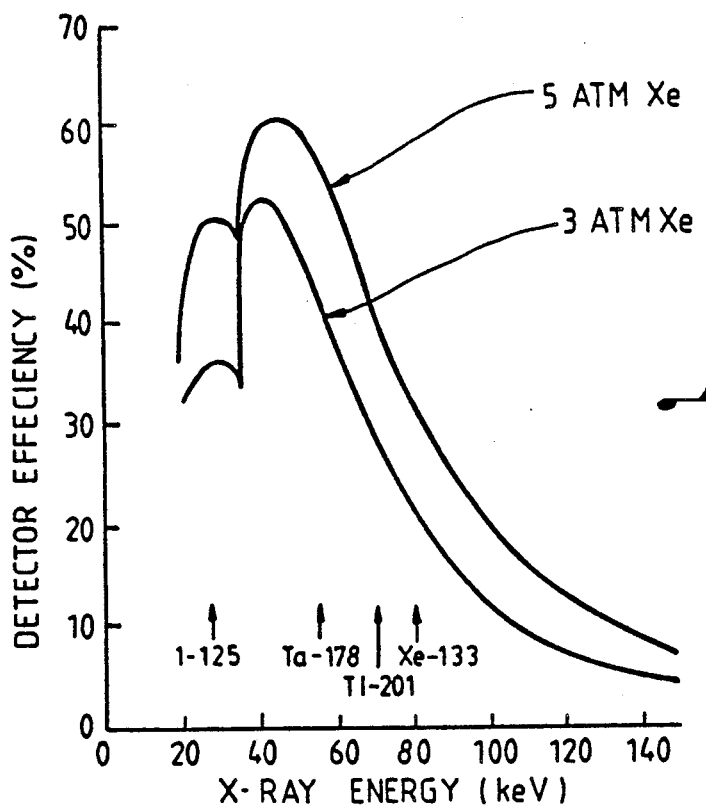
FIG. 4 is a graph of the efficiency of the detector of this invention plotted against x-ray energy for operating pressures of 3 and 5 atmospheres absolute.

The camera of this invention has been tested and found to be a substantial improvement over prior cameras used in nuclear medicine. The absolute detection efficiency of the detector operated at 3 and 5 atmospheres (absolute) is plotted in FIG. 4. The efficiencies at the energies of the potentially useful nuclides I-125, Ta-178, Tl-201, and Xe-133 are indicated. Thorough pressure testing of the camera indicates that it can be operated safely at pressures up to 5 atmospheres absolute pressure (with a safety factor of 4). All results described herein were obtained at 3 atm (absolute).

The energy deposition mechanism in a MWPC is dependent on the energy of the incident photon. For energies below the K-shell excitation energy of xenon (35 keV), L-shell interactions occur and most of the photon energy is deposited entirely at the interaction site. For energies above 35 keV, the excess energy above 35 keV is deposited at the interaction site as a photo electron. In addition, a 30-keV fluorescence photon is emitted 88% of the time (12% of the fluorescence emissions are internally converted, leading to total energy deposition at the interaction site), and a 5 KeV L fluorescence electron deposits its energy, also essentially at the interaction site.

Figure 5:
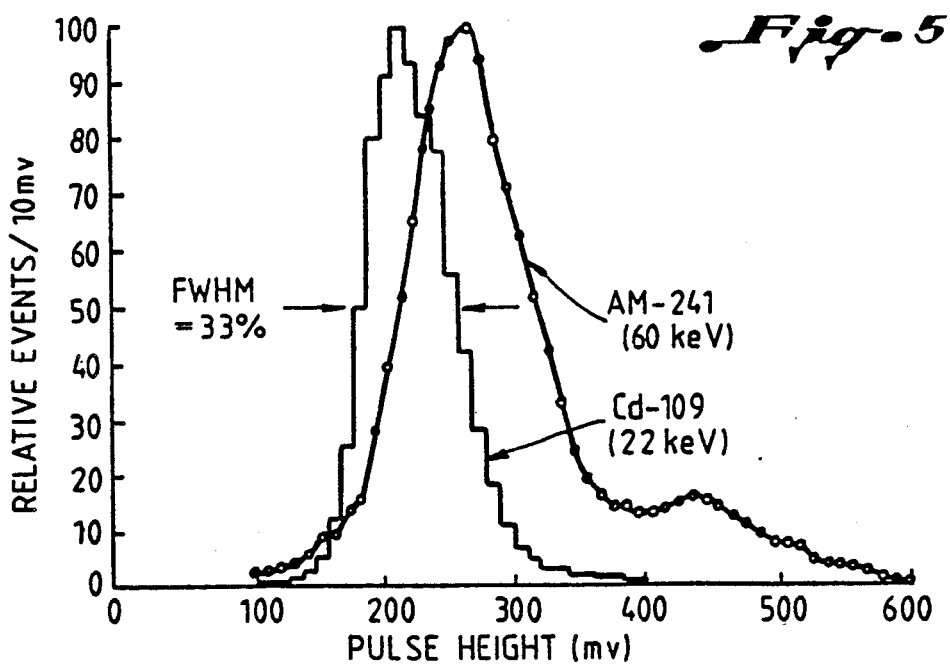
FIG. 5 is a graph depicting the energy spectra of Cd-109 and Am-241.

To demonstrate the energy resolution characteristics of the MWPC of this invention, displayed in FIG. 5 are the energy spectra of Cd-109 and Am-241. Cd-109 emits dominantly 22 keV x-rays (Ag K x-rays) and a very low abundance (3%) 88 keV photon, whereas Am-241 emits only a 60 keV photon. Thus, these two nuclides produce 22-keV and 30-keV deposited energy. With 30-keV fluorescence escape in our detector design, the intrinsic energy resolution for 60-keV x-rays from FIG. 5 is 33% of 30keV, or 14% (FWHM) of the total incident energy. This is the energy-resolution figure that should be used for comparisons with NaI devices which have negligible fluorescence escape.

An idiosyncracy resulting from fluorescence escape is noteworthy. An x-ray, such as that from Ta-178, which is 25 keV above the xenon K-shell energy, is indistinguishable from x-rays of 25 keV total incident energy, since the latter are below the xenon K shell. Thus, energy windows set to accept 50–70 keV x-rays, as might be done for Ta-178 imaging, will also accept Compton degraded x-rays in the energy range 15–35 keV. This is of little practical consequence, however, since very little of the Compton radiation is able to scatter down from 60 keV to 35 keV and penetrate intervening tissue. What little flux may be present in this energy range can be very effectively removed with a copper filter. This effect would be a problem only for nuclides with emissions much closer to the K-shell energy.

Gas contamination is a well-known phenomenon in long-term sealed operation of MWPC detectors. Electronegative gas contaminats, which can result from outgassing of detector interior structure, cause loss of primary ionization produced by x-ray interactions. Effects of such contaminants show up as a spreading of the detector's energy resolution. To evaluate this potential problem, the Cd-109 pulse-height spectrum was carefully monitored for loss of resolution over a period of 90 days. No discernible deterioration occurred over this period. Thus, gas contamination is not expected to be a significant operational problem.

Figure 6:
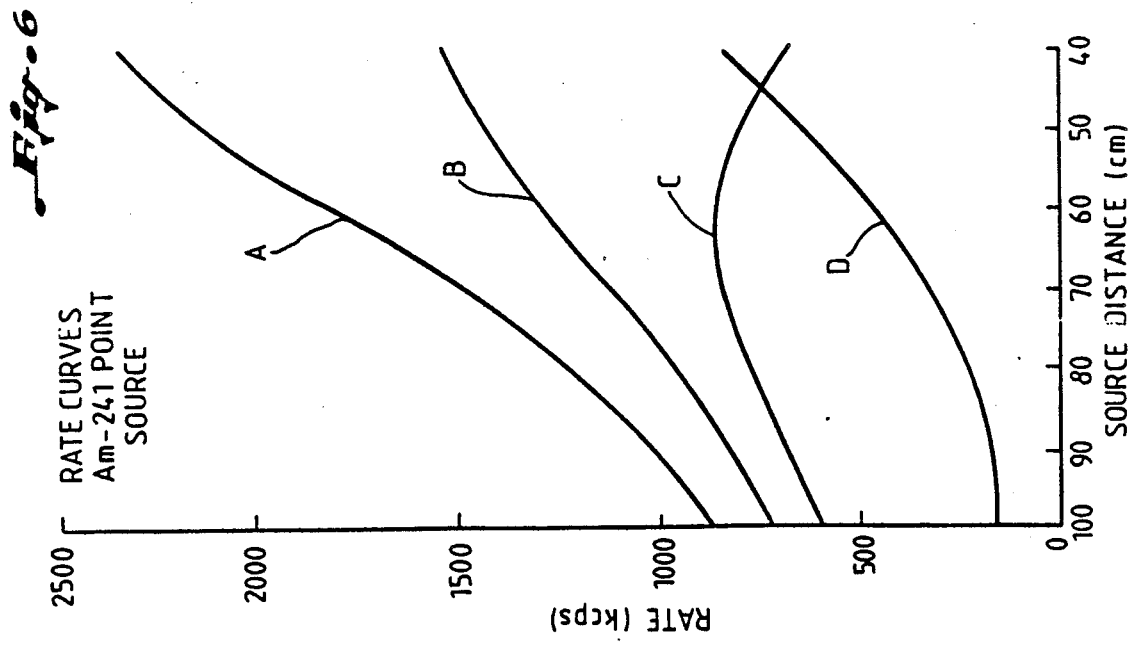
FIG. 6 is a graph depicting detector rates for an uncollimated detector of the present invention irradiated by an Am-241 source plotted against distance of the source from the face of the detector.

The event-rate performance of the camera was investigated by irradiation of the uncollimated camera with a 40 mCi Am-241 source. In FIG. 6 various rates are plotted against the distance of this source from the camera. The image rate curve (C) shows the paralyzing behavior typical of both Anger and multicrystal cameras, with a peak count rate of 850,000 cps. At this peak count rate approximately 50% of the events interacting in the detector pass through the digitizing circuitry into the image. Curve A is the anode discriminator rate; curve B is the rate at which events pass the energy window; and curve D is the rate of event rejection by the sum test logic used in the present invention.

Figure 7:
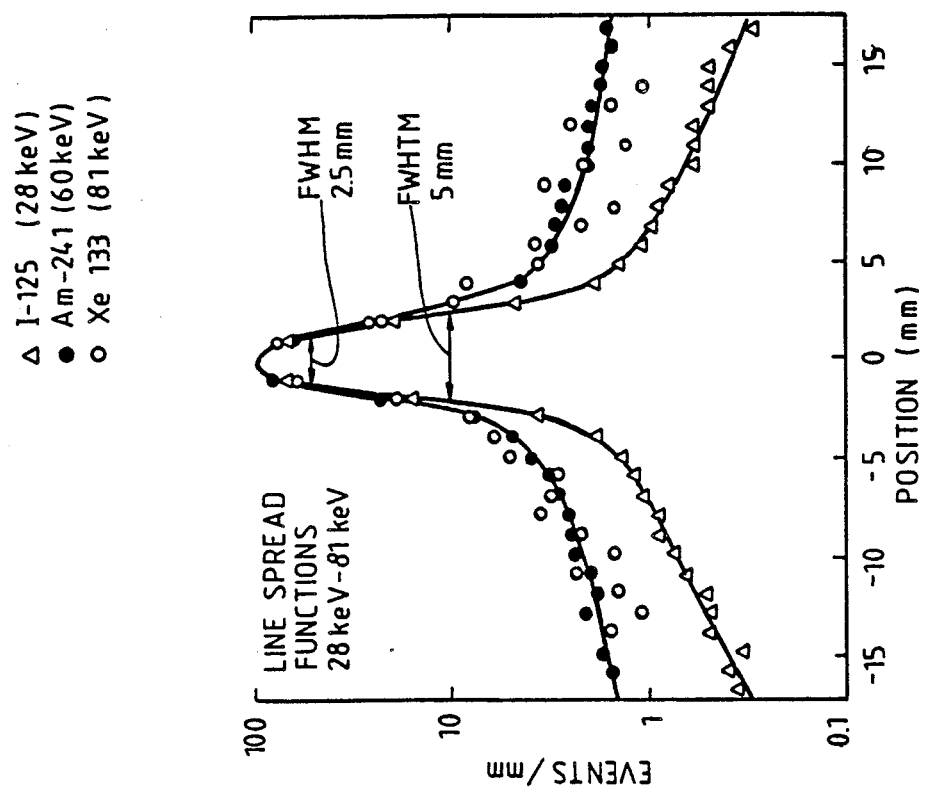
FIG. 7 is a graph depicting the line spread functions reflective of the intrinsic resolution of the detector of this invention.

The intrinsic detector resolution was determined by irradiation of the detector along a narrow line (<1 mm width). FIG. 7 shows the line spread functions measured in this way for x-ray energies of 28, 60, and 81 keV. (For Xe-133 a 1 mm copper absorber was used to remove the abundant 30 KeV xenon fluorescence x-rays). The resolution at 28 keV determined by this technique is 2.5 mm full width half maximum (FWHM) and 5 mm full width tenth maximum (FWTM). These values are degraded by less than 5 percent for 60 keV and 81 keV x-rays.

As previously indicated, most of the detected events in the MWPC are events for which fluorescence escape has occurred. Flourescence photons have a large mean range in the gas (11 cm). Thus, in the small percentage of cases that these x-rays interact, they can significantly alter the measured x-ray position. The effect of fluorescence on resolution can be quantified by comparing the 60 keV and 81 keV line spread functions with that for 28 keV x-rays from I-125 (FIG. 7). The latter do not excite fluorescence. The FWHM and FWTM values are only very slightly degraded by the presence of this radiation; however, the effect of fluorescence shows up in two subtle ways. First, there is a low-level halo effect, which appears as a small tail in FIG. 7. It results from clean detection of a fluorescence photon, usually many centimeters from the interaction site. Second, a higher sum-test rejection rate is observed for the 60 keV radiation. At low event rates, 13% sum test rejection is observed for 60 keV whereas 3% is observed for 22 keV. These measurements show that very small effects on image quality result from fluorescence. The effect is limited to a slight reduction in sensitivity (10%) and a very low-level, diffuse halo. Most of the events with associated fluorescence interactions are rejected by the sum-test logic.

Image uniformity was investigated by irradiation of the uncollimated detector with an Am-241 source at a distance of 1.5 meters. In the resulting flood images, using a pixel resolution of $2\times2$ mm$^2$, uniformity fluctuations of at most $\pm5\%$ are present. Most of the nonuniformity is confined to very high-frequency fluctuations within a spatial scale of less than 3 mm. These likely result from differential nonuniformities of the delay lines and from slight variations in detector wire spacing. The nonuniformities have been shown to be both stable and correctable. In the "flood corrected" flood images, the nonuniformities have been reduced to less than $\pm1\%$. In many applications, such as cardiac imaging in which high spatial resolution (<5 mm FWHM) is not required, such correction is not necessary.

In order to compare the overall image quality of the MWPC of this invention with that of the Anger camera, I have performed standard phantom testing. A series of images was obtained by irradiation of the uncollimated detector through a standard Anger pie phantom. An Am-241 source was used at a distance of 1.5 m. A zoom effect in the resultant images was obtained by varying the digitizer oscillator frequence from 100 to 500 MHz in 100-MHz steps. The images were collected in $128\times128$ format, with the cell size ranging from $1\times1$ mm for the 500-MHz image to $5\times5$ mm for the 100-MHz image. All elements of the standard phantom were well resolved with high contrast. Image distortions were investigated by irradiation of the detector through a standard Smith orthogonal hole phantom (0.63-cm spaced grid of holes 0.16 cm in diameter). An Am-241 source was used at a distance of 1.5 meters. The resulting image, obtained in $128\times128$ format, $1\times1$ mm cell size, with a detector count rate of 100,000 cps, demonstrated the excellent image uniformity of this device showing no detectable nonuniformities down to the resolution of the phantom.

Two conventional parallel square-hole collimators have been employed with the MWPC camera. Their characteristics are shown in Table 2.

TABLE 2

COLLIMATOR CHARACTERISTICS CONVENTIONAL SQUARE HOLE

| Collimator | Hole Length (cm) | Hole Size (cm) | Septal thickness (cm) | Sensitivity |
|---|---|---|---|---|
| High resolution (HR) | 2.2 | 0.14 | 0.018 | 9050 cps/mCi |
| High sensitivity (HS) | 1.1 | 0.14 | 0.018 | 36200 cps/mCI |

Most previously disclosed studies used the high-sensitivity (HS) collimator, which was chosen to provide adequate resolution and high sensitivity for dynamic cardiac studies. This collimator has an intrinsic sensitivity more than twice that of the multicrystal (Baird) 1.5" collimator and smaller angular acceptance by a factor of 0.77. This higher sensitivity more than offsets the lower efficiency of the MWPC relative to NaI. This is a result of the much larger packing fraction of the conventional collimator optimized for low energies, as compared with the Baird collimator, which has very thick septa.

The sensitivity of the detector operated at 3 atmospheres, measured for the high-sensitivity and high-resolution (HR) collimators, is shown in Table 3 for I-125 and Ta-178 emitters. The calculated sensitivities for Tl-201 and Xe-133 are also included.

TABLE 3

INSTRUMENT SENSITIVITY IN cps/mCi FOR VARIOUS EMITTERS

| Collimator | I-125 | Ta-178 | Tl-201 | Xe-133 |
|---|---|---|---|---|
| High resolution (HR) | 3700 | 3710 | 2830 | 2125 |
| High sensitivity (HS) | 15000 | 14900 | 11351 | 8513 |

Figure 8:
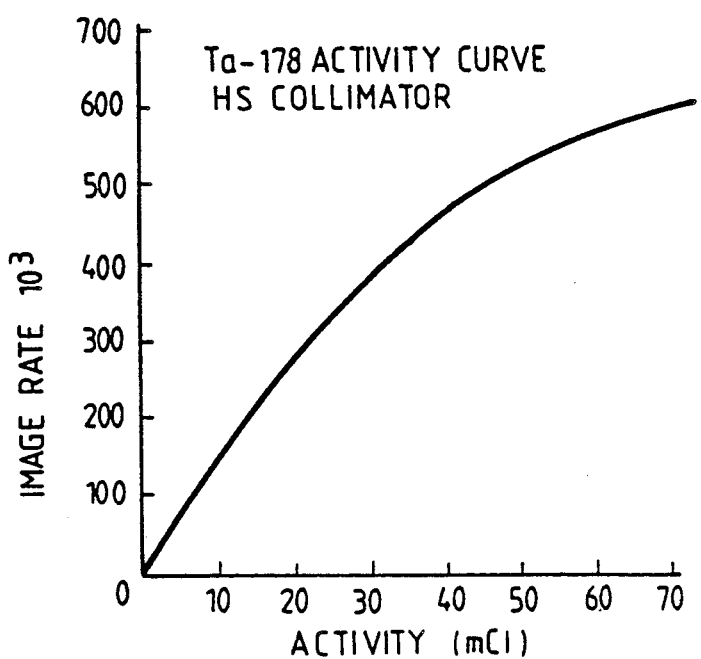
FIG. 8 is a graph depicting the dose-response curve produced by decaying Ta-178 solution in a three-inch beaker placed three inches above the MWPC camera of this invention with a high-sensitivity collimator.

The image count rate relative to the Ta-178 dose has been determined. A three inch diameter beaker containing 70 mCi of Ta-178 in water solution was placed 3 inches above the face of the camera with the HS collimater in place, and the event rate in the detector recorded for a 30-minute period (>3 half-lives). The resulting dose-response curve is plotted in FIG. 8.

Figure 9:
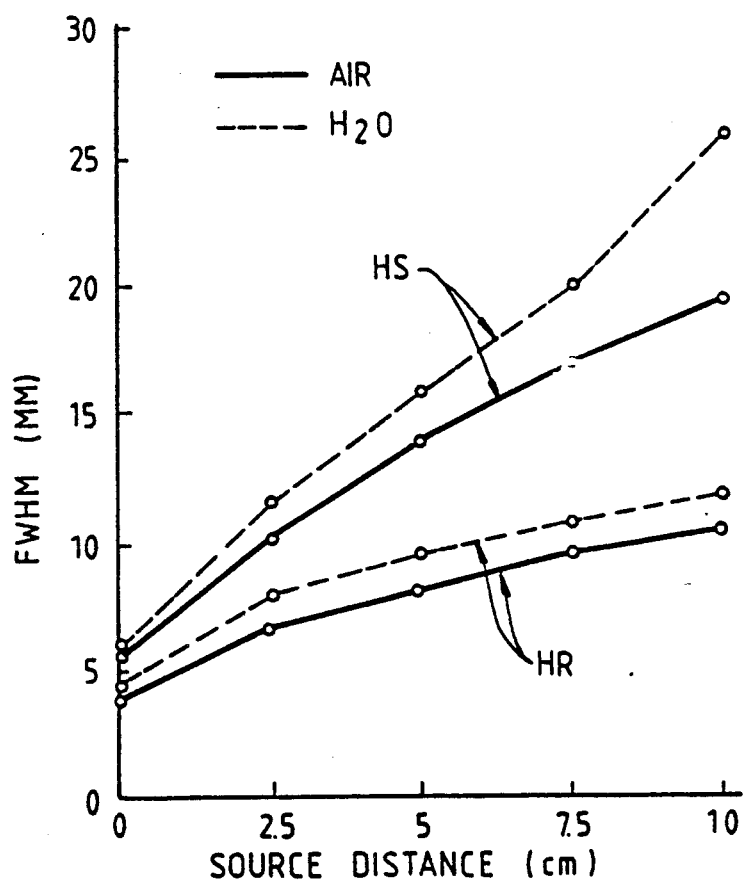
FIG. 9 is a graph depicting the resolution performance of the MWPC camera of this invention by plotting the full width half maximums (FWHMs) from point spread functions obtained for various distances between source and collimator in air and in water.

The resolution performance of the subject MWPC camera, using the HS and HR collimators, has been investigated using an Am-241 source 2 millimeters in diameter. The point spread functions were obtained for various distances between source and collimator in air and in a water bath 15 centimeters deep. The FWHMs from these point spread functions are plotted in FIG. 9. Note that although much of the Compton-scattered radiation is detected due to the small energy loss in a single Compton interaction at 60 keV, it has very little effect on FWHM. This is doubtless because the Compton angular distribution at 60 keV is nearly isotropic. Thus, much of the scatter entering the collimator is relatively far from the source, resulting in a highly diffuse halo.

Increased attenuation loss is a concern often expressed with regard to application of low-energy emitters. It is important to realize, however, that the differences between 140 keV and 60 keV is of minimal significance in many applications. The mass attenuation coefficients of soft tissue at these two energies are 0.154 $cm^2/g$ and 0.204 $cm^2/g$, respectively. At tissue depths typically encountered in cardiac imaging (5-10 cm), 60 keV produces a transmitted flux of 73% of that produced by an equal 140-keV dose. Only for deep-organ imaging (>10 cm depth) are image statistics significantly affected by 60 keV x-ray attenuation compared with Tc-99m. For example, at a 15 cm depth, 60 keV radiation is attenuated to 47% of that of 140 keV radiation. Bone attenuation is another potential concern. To evaluate the effect of sternum and rib attenuation upon cardiac images, I have measured the total attenuation of 60 keV radiation in human cadaver dry specimens. In the anterior and left anterior oblique projections, the total sternal attenuation in an average subject was found to be less than 4%, and the rib attenuation less than 3%. These values are below the statistical noise level in typical cardiac images, and therefore should be of little consequence.

In addition, first-pass radionuclide ventriculography studies have been carried out in animal subjects in order to determine the effectiveness of tis new MWPC camera and Ta-178 combination in a common dynamic study. A 34 kg dog and a 68 kg pig were studied. Several studies were performed in each subject at short repeat intervals to determine the reproducibility of ejection fraction and wall-motion measurements. Images were evaluated for overall quality. For comparison, a study was carried out in a pig using Tc-99m and a Baird multicrystal camera. All MWPC studies used the high-sensitivity collimator, whereas a standard 1 inch collimator was used with the multicrystal camera.

A hugular venous catheter was implanted in each subject to provide for reproducible bolus injection and for convenience in handling the subjects. The catheter was inserted to the junction of the superior vena cava and right atrium. All subjects were anesthetized for the duration of the studies. Pentobarbital was employed in the dog and sodium thiamylal in the pig in titrated amounts to produce sedation but not respiratory arrest. Tantalum-178 was injected in all cases as a 1.5 ml bolus followed by a 10 ml rapid saline flush (<0.5 second injection time). Technetium-99m was injected as a 0.5 ml bolus followed by a 10 ml flush.

Detailed subject data are shown in Table 4. MWPC image data were collected in a 16×16 cell format and 1 $cm^2$ pixel area. Frame collection was begun just before injection and continued for 20 seconds. The frame rate was varied from study to study so that approximately 16 frames per cardiac cycle were collected. The multicrystal camera study used the standard procedure with 50 fps.

TABLE 4

SUBJECT DATA

| Subect Number | Species | Weight | Anesthesia | Ta dose | or Tc dose |
|---|---|---|---|---|---|
| 1 | dog | 32 Kg | nembutal | 20 mCi | — |
| 2 | pig | 68 Kg | sodium thiamylal | 12 mCi | 15 mCi |

All studies were analyzed to obtain left-ventricular volume curves, ejection fraction, and representative cycle images. Data analysis of the MWPC studies was identical to that of the Baird study with two exceptions. A first-order spatial smoothing was applied to the raw data rather than the temporal smooth, and the left-ventricular phase background subtraction was applied without temporal variation.

Three studies were performed on Subject 1 (Table 4) at 30 minute intervals, the first two in the anterior position and the third in the left lateral. Subject 2 was studied once in the left lateral and once, 1 hour later, in the anterior position. The multicrystal camera comparison studies were performed on this subject 2 hours later, with light anesthesia maintained in the interim. A left lateral study was performed first (15 mCi of Tc-99m), followed 15 minutes later by an anterior study (15 mCi of Tc-99m). A static background was collected between studies and used to subtract background from the second study.

The analyzed left-ventricular images for one anterior and one left-lateral canine study were produced. In doing so the diastolic image border, defined as the point at which the background-subtracted image is 30% of the highest pixel, was shown in white. The color-encoded systolic image was superposed on this border. A second anterior study was virtually indistinguishable from the first. The calculated ejection fractions for the three studies were 49 and 46% for the two anterior studies and 54% for the left-lateral.

Analyzed left-ventricular images from the pig (Subject 2) were also produced. Ejection fractions of 62% and 68% were found for the anterior and left-lateral views, respectively. A comparison of the left-lateral MWPC study and a similar one on the multicrystal camera was also produced, and, for ease of comparison, both studies were analyzed on the multicrystal system using identical procedures. The injected doses were 12 mCi (Ta-178) and 15 mCi (Tc99m). The measured ejection fractions were 62% and 64%.

Via this procedure, it was evident that the left ventricle is well visualized by this technique. Wall motion is easily determinable. Further, measurements are repeatable to the extent that the physiologic specimen can be expected to remain stable from study to study.

The MWPC/Ta-178 study compares well with the multicrystal/Tc-99m study. Qualitatively, the images are very similar. Two differences were noted in the data. The total-image statistics for the Ta178 study were 30% lower for the same administered dose, and the ventricular cross-sectional area, as determined by standard Baird software, was somewhat increased (25%). The former effect is doubtless a result of the slightly higher attenuation of 60 keV radiation relative to 140 keV. The latter effect probably results from the presence of more background in the Ta-178 study, which is not handled correctly by the standard Baird background subtraction. A separate background technique for Ta-178 will likely be needed for absolute volume measurements.

These tests evince that the much improved count rate, resolution, and portability of the MWPC detector of this invention should lead to significantly enhanced capabilities in clinical nuclear medicine applications. It will, however, have certain optimal areas of application. The limitation of the MWPC to energies below 100 keV makes the imaging of deep organs (<10 cm) difficult due to greater attenuation losses. The concomitant problem with the low-energy limitation, suboptimal scatter rejection, makes it less likely that the MWPC will compete in photon-deficient applications such as liver imaging. This MWPC should excell, however, in imaging of shallow organs with foci of increased activitiy, benefiting from high count capability combined with good spatial resolution. Thus, cardiac imaging is a most promising area of application. Many of the limitations in this field currently result from poor counting statistics in first-pass studies and long acquisition times in gated studies. Significant improvement in both of these areas should result from use of this MWPC and Ta-178. They offer whole body doses a factor of 20 and critical-organ doses a factor of 65 below those of Tc-99m. Therefore, much larger injected doses are possible and multiple studies can also be performed. This, combined with the high count capability of the MWPC, will provide greatly improved image statistics in first-pass studies and lower acquisition times in gated studies. Additional benefits in this field will likely accrue from the compactness of the MWPC, which will allow multiple-head cameras providing simultaneous multiple-view imaging. Single or multiple-head devices with high portability are also possible for application in coronary care units and mobile clinic settings.

Pediatric cardiac applications in particular should benefit greatly from the low radiation exposure of Ta-178. The higher resolution of this MWPC should offer an important enhancement as well in this area, where very high count rates can be achieved over small spatial dimensions. One can envisage such applications as serial shunt quantitation in which a patient could be studied repeatedly to evalute shunt status, without catheterization. Also, many forms of anomalous cardiac structure could be assessed with Ta-178 first-pass studies. Yet another application is serial evaluation of the effects of corrective surgery.

Although some of the advantages of Ta-178 could be achieved with NaI devices, cameras currently on the market have significantly compromised performance with Ta-178 due to high-energy emissions at 0.5 and 1 MeV. These photons penetrate even very-high-energy collimators and are picked up by the NaI crystal with enough efficiency to produce significant deadtime losses. Although these high-energy gammas penetrate the MGC collimator, they are picked up by the gas detector with far lower efficiency and therefore have little or no effect on deadtime.

Radiology is another field of application for which the MWPC of this invention is well suited. Bone densitometry can be carried out by transmission imaging in a fraction of the time required for the scanning techniques, the use of which is increasing. The MWPC has excellent detection characteristics for x-ray energies appropriate for this work (30–80 keV). The high rate capability of the device of this invention allows very rapid single-image acquisition, which may be of importance for such applications as osteoporosis screening and diagnosis. This may allow multiple views to be acquired or even tomographic image formation in the same or less time than is required for single-view images using current technology.

Finally, lower instrumentation cost is another significant advantage of the MWPC camera of this invention. If mass produced, this device should be much cheaper and easier to maintain than sodium iodide devices, and considerably more rugged. The MWPC readout system disclosed and described above, being digital in nature, is entirely free from adjustment problems such as those caused by photomultiplier gain drift in the crystal cameras.

In summary, the subject technology distinguishes itself significantly both from prior art in the earlier multiwire cameras and from existing art employed in commercial sodium iodide cameras. A major distinguishing feature between the technology of this invention and the Perez-Mendez and Borkowski and Kopp systems described previously is the means of electronic readout. Although the delay line technique is employed in this system, it differs substantially from that of the Perez-Mendez system. These differences include: (1) the use of low impedence, high speed delay lines; (2) these lines are directly coupled to the cathode grid wires grids rather than capacitively coupled; and (3) a means for rejecting confused events is provided which can be performed at the high event rates required. These distinctive features have lead to improvement by an order of magnitude in rate performance. Furthermore, with rapid rejection of confused events, clean images are produced even at the very highest rates allowed by the multiwire detector. These improvements have been accomplished concomitant with preservation of both energy resolution and spatial resolution. Both of these parameters, in fact, have been maintained at a level compatible with the basic limitations of the detector itself, i.e., they are not degraded significantly by the characteristics of the readout system.

The improvements over existing commercial technology for nuclear medicine imaging fall into two catagories, (1) imaging performance improvements and (2) improved functionality provided by the lighter and more compact camera. First in the area of imaging performance improvements, the described camera provides major improvements in the following areas: (1) high rate performance; (2) spatial resolution; and (3) image uniformity. As described hereinabove, current commercial NaI devices provide either good spatial resolution combined with poor rate performance (Anger system) or poor spatial resolution combined with better but still suboptimal rate performance (multicrystal system). Both systems are further hampered by poor image uniformity. The subject invention provides a system having spatial resolution typically a factor of two superior to the Anger system, rate performance a factor of two superior to the multi-crystal system, and image uniformity superior to either system.

In the area of improved functionality, the multiwire camera of this invention represents a substantial advance over either Anger or multicrystal systems. A typical so-called "portable" Anger camera detector head weighs 500 pounds. The only currently available multi-crystal camera weighs more than a thousand pounds and is distinctly nonportable. This size and bulk results in significant limitations, particularly in bedside imaging procedures in critically ill patients. Thus, particularly in the area of diagnosis and management of critically ill heart patients, the systems are likely limiting applications quite significantly. The subject invention provides a camera head weighing 50 pounds in a package smaller by about a factor of 5 than the smallest NaI devices. Thus, it could easily satisfy the portability requirements of bedside imaging. The considerably improved rate performance with concomittant excellent spatial resolution also points to applications of the device in cardiac imaging where there is a substantial need for the high speed imaging required to view the moving cardiac structures.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of components will readily suggest themselves to those skilled in the art and which are encompassed within the spirit of the invention and the scope of the appended claims.

What is claimed is:

1. In a photon camera for imaging X-ray or gamma ray radiation sources, a multiwire proportional counter detector comprising:
   a. a gas-filled proportional counter envelope having a photon radiation pervious window therein for receiving radiation from said source;
   b. two multiwire cathode planar electrode grids disposed within said counter envelope, said cathodes being disposed at some angle to one another;
   c. an anode planar electrode grid disposed within said counter envelope between the cathode electrode grids;
   d. a positive voltage means connected to said anode;
   e. means disposed in said envelope for producing ionization of the gas upon passage of radiation into the envelope and for producing a consequent avalanche of electrons to said anode and an induced electrical pulse on each of said cathode grids;
   f. a 20–20 nanosecond per centimeter discrete element delay line comprising at least a plurality of delay segments,
      each delay segment exhibiting;
      a discrete tapped inductor, configured to provide phase compensating mutual inductance between inductor segments,
      discrete tapped inductor is connected to at least one adjacent delay segment; and
      a discrete capacitor connected between a tap of said inductor and a low inductance ground bus;
      wherein a contiguous group of one or more cathode wires are directly electrically connected to a delay segment between a gap of said inductor and said discrete capacitor.
   g. a plurality of cathode signal detection means, each individually connected to the anode and to a discrete delay line terminal for measuring the delay time between the occurrence of an avalanche on the anode and the arrival of the resultant signal at the respective delay line terminal; and
   h. signal processing means connected to said cathode signal detection means for transforming the measured delay times into event positions so that the location of the event relative to the cathodes may be ascertained.

2. The apparatus of claim 1 further comprising:
   a pile-up rejection means electrically connected to the cathode signal detection means for preventing an output of said signal processing means upon recognition of multiple ionization events occurring during a readout window.

3. The apparatus of claim 1 further comprising
   a pile-up rejection means electrically connected to the cathode signal detection means for summing the measured delay times for a given delay line and comparing said sum with the known total delay of the line and rejecting the measured delay times if such compared values are not equivalent.

4. The apparatus in claim 3 wherein the cathode grids are disposed orthoganally to one another.

5. The apparatus of claim 4 wherein the cathode grids are equidistant from the anode grid.

6. The apparatus of claim 3 wherein the gas within the envelope is a predominantly xenon-methane mixture.

7. The apparatus of claim 6 wherein the gas mixture is approximately 90% xenon and 10% methane.

8. The apparatus of claim 3 further comprising an energy selection means connected to the anode for comparing the amplitude of a signal on the anode to minimum acceptable and maximum acceptable pulse amplitudes, so that, in the event a measured anode signal has a lesser or greater amplitude, the event is not further processed by the signal processing means.

* * * * *

UNITED STATES PATENT AND TRADEMARK OFFICE
CERTIFICATE OF CORRECTION

PATENT NO. : 4,999,501
DATED : March 12, 1991
INVENTOR(S) : Jeffrey L. Lacy

It is certified that error appears in the above-identified patent and that said Letters Patent is hereby corrected as shown below:

Column 12, line 34, change "hugular" to  - jugular--.
Column 16, line 25, claim 1, change "20-20" to --2-20--.
           line 39, claim 1, change "gap" to --tap--.

Signed and Sealed this

Fifteenth Day of December, 1998

Attest:

BRUCE LEHMAN

*Attesting Officer*            *Commissioner of Patents and Trademarks*